United States Patent
Guttenberger

(10) Patent No.: US 7,579,728 B2
(45) Date of Patent: Aug. 25, 2009

(54) ELECTRIC DRIVE WITH EXPANDABLE CATCH AND PROTECTIVE DEVICE

(75) Inventor: Richard Guttenberger, Greding (DE)

(73) Assignee: Buehler Motor GmbH, Nuremberg (DE)

( * ) Notice: Subject to any disclaimer, the term of this patent is extended or adjusted under 35 U.S.C. 154(b) by 514 days.

(21) Appl. No.: 11/377,674

(22) Filed: Mar. 17, 2006

(65) Prior Publication Data

US 2006/0208588 A1 Sep. 21, 2006

(30) Foreign Application Priority Data

Mar. 18, 2005 (DE) .................. 10 2005 012 620

(51) Int. Cl.
*H02K 5/00* (2006.01)
(52) U.S. Cl. .................... 310/71; 310/89; 310/239; 310/90
(58) Field of Classification Search ............. 310/71, 310/89, 90, 239
See application file for complete search history.

(56) References Cited

U.S. PATENT DOCUMENTS 5,650,676 A * 7/1997 Blumenberg ............. 310/88
5,864,188 A 1/1999 Gerrand et al.
6,078,117 A * 6/2000 Perrin et al. ............. 310/68 R
6,078,118 A * 6/2000 Reinartz et al. ............. 310/89

FOREIGN PATENT DOCUMENTS

| DE | 195 32 265 A1 | 3/1997 |
|---|---|---|
| DE | 198 13 039 B4 | 10/1999 |
| DE | 199 25 321 A1 | 12/2000 |
| DE | 697 08 983 T2 | 9/2002 |
| DE | 103 19 187 A1 | 11/2004 |

\* cited by examiner

*Primary Examiner*—Dang D Le
(74) *Attorney, Agent, or Firm*—Jacobson Holman PLLC

(57) ABSTRACT

An electric drive for an electric motor. The electric drive is made up of components consisting of a brush holder plate and a bearing plate which are interconnected via at least one snap-on connector with an expandable catch means that is disposed on an external area of an electric motor, a drive motor, or a positioning drive in such a manner that it projects out. The electric drive can be securely mounted and handled in an economical manner without additional components and without complicated manufacturing equipment. This objective is accomplished by the fact that the expandable catch means is protected by a protective device against unintentional expansion of the catch means and thus loosening of the snap-on connector.

19 Claims, 7 Drawing Sheets

Fig.7
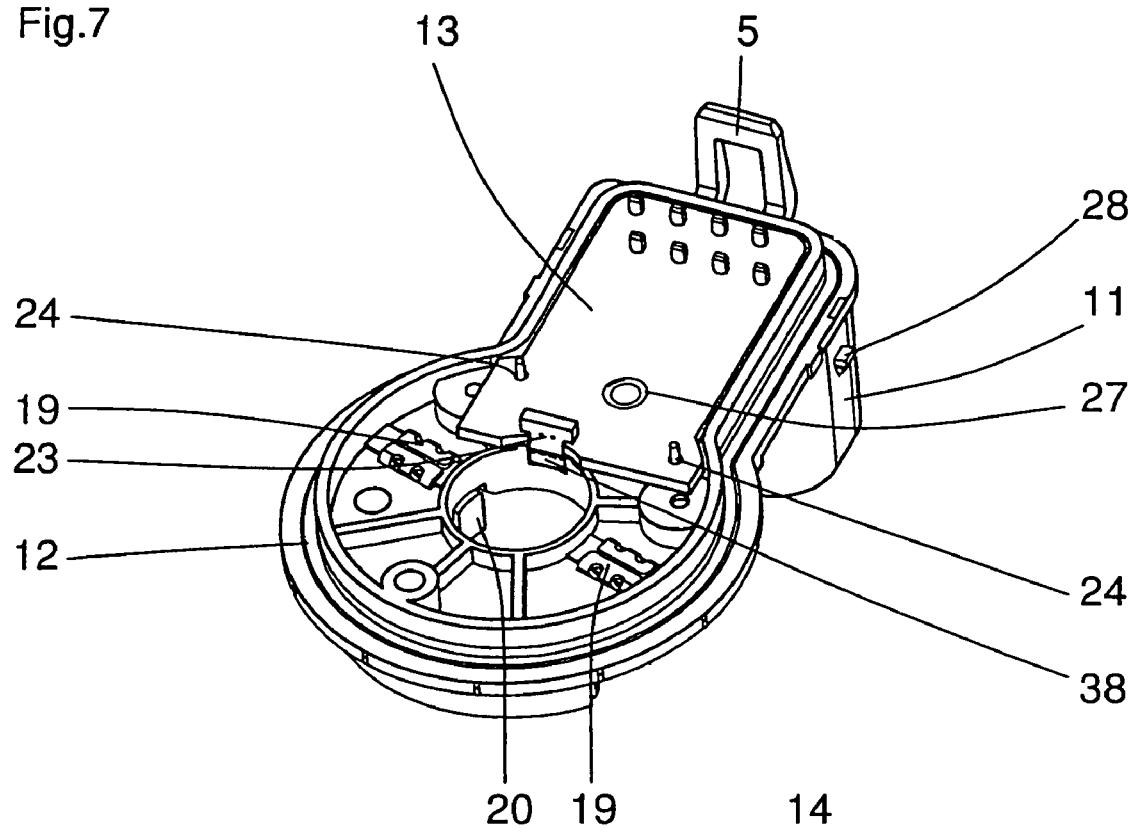
Fig.8
Fig.9
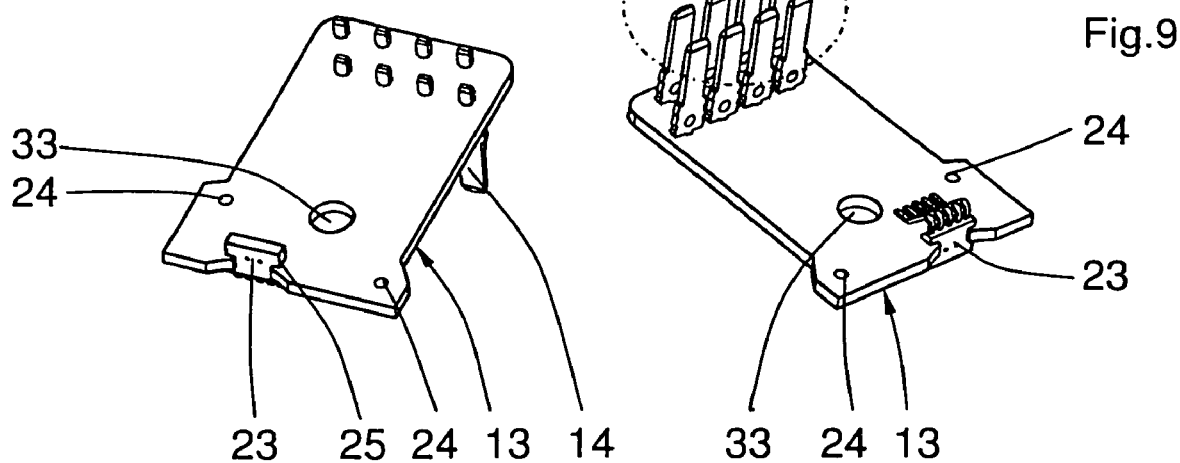

ELECTRIC DRIVE WITH EXPANDABLE CATCH AND PROTECTIVE DEVICE

BACKGROUND OF THE INVENTION

1. Field of the Invention

The invention relates to an electric drive, in general, and to an electric drive with components, such as a brush holder plate and as bearing plate, which are interconnected via a novel connector, in particular.

2. Description of Related Art Including Information Disclosed under 37 CFR 1.97 and 1.98

German patent DE 198 13 039 B4 shows a positioning drive where there are two components which are interconnected via several snap-on connectors. Each of the snap-on connectors consists of catch noses and catch eyelets which are completely unprotected and thus it is not possible to rule out damage during handling and mounting. Releasing the connection unintentionally is however hardly possible due to the plurality of snap-on connectors. Applications are also known in which there are only a few snap-on connectors, or even only one, where unintentional loosening or damage of the snap-on means can have serious consequences. From the state of the art, securement possibilities are also known which prevent loosening of the snap-on connector. However they have a very complex structure and cannot be produced economically.

BRIEF SUMMARY OF THE INVENTION

It is thus the objective of the invention to present an electric drive which can be securely mounted and handled in an economical manner without additional components and without complicated manufacturing equipment.

This objective is realized according to the invention by the fact that in the inventive electric drive includes an expandable catch means which is protected by a protective device against unintentional expansion of the catch means and thus loosening of the snap-on connector. During the mounting of electric motors, drive motors, or positioning drives, no components may be damaged or unintentionally dismounted. This is ensured by the protective device which shields the perceptibly expandable catch means so that an undesired expansion is only remotely possible.

Good interference suppression results from short conductor connections. This is achieved in the present invention by the fact that the electrical connection between plug lugs and carbon brushes, which are mounted on the brush holder plate in tubular brush holders in such a manner that they can move in the axial direction, is produced via the tracks of the printed circuit board, where inductors on one side electrically contact these tracks and on the other side are electrically connected to carbon leads of the carbon brushes.

So that no additional parts are needed for the protective device, the protective device is formed as one piece with at least one of the components interconnected. Preferably the protective device is formed by initially forming an interconnection with at least one of the components. This is possible in particular with the use of injection molded plastic parts or diecast metal parts. Alternatively, the protective device can also be formed by initially forming an interconnection along with at least one of the components, for example, if the corresponding component is a punched bent part.

It is particularly advantageous if the protective device, when mounted, has a greater extension than the expandable catch means and, at least in the area of its greatest expandability, i. e. at its end area, projects over it in the direction of its connection and/or expansion. Thus it is insured that the protective device is always in contact with walls or other components during handling or mounting and not the expandable catch means.

Other objects, features and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 7 is a top perspective view of the brush holder plate, and FIGS. 8 & 9 are perspective views of a printed circuit board found in the present invention.

DETAILED DESCRIPTION OF THE INVENTION

Figure 1:
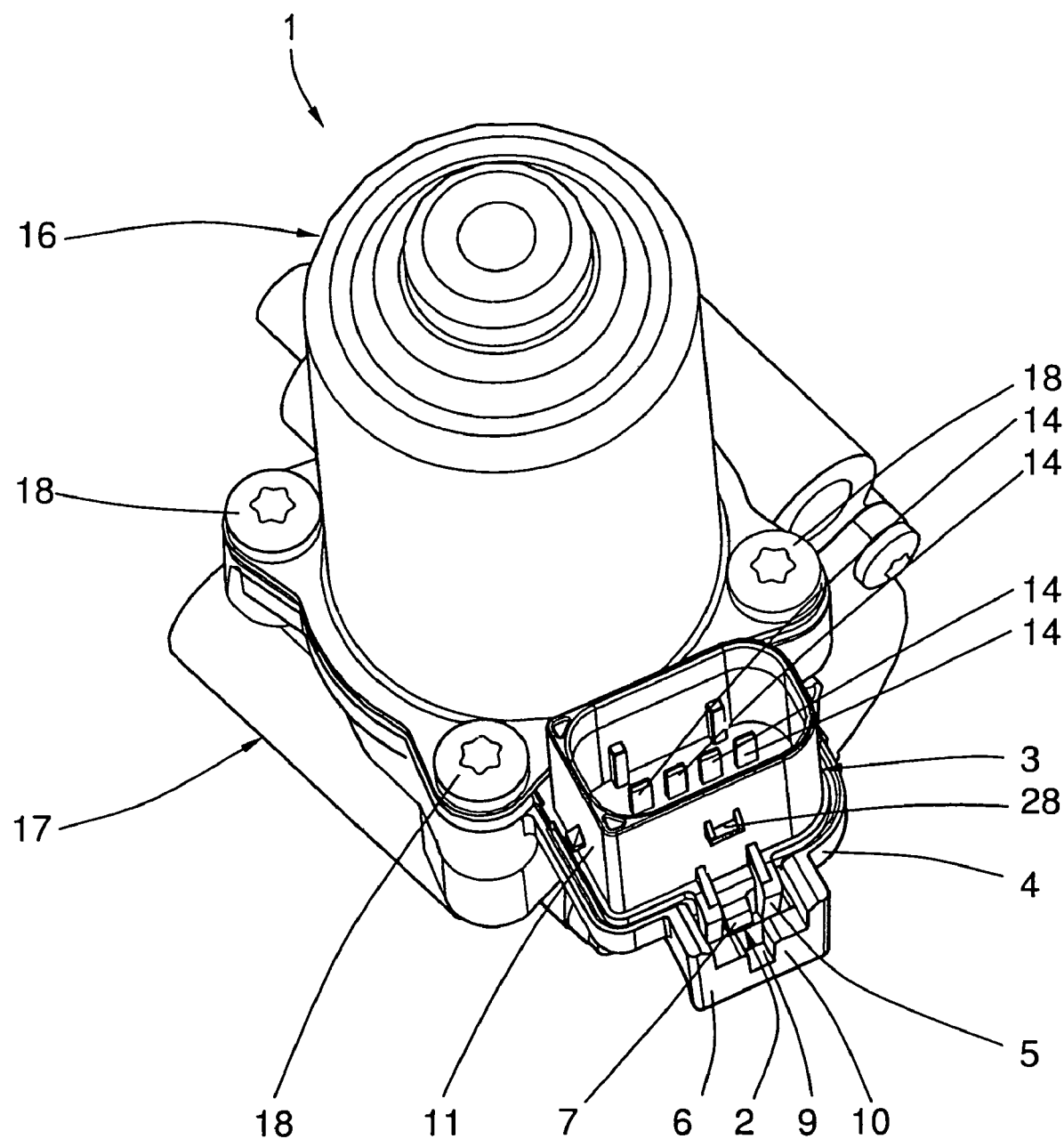
FIG. 1 is an offset perspective view of an electric drive embodying the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 2:
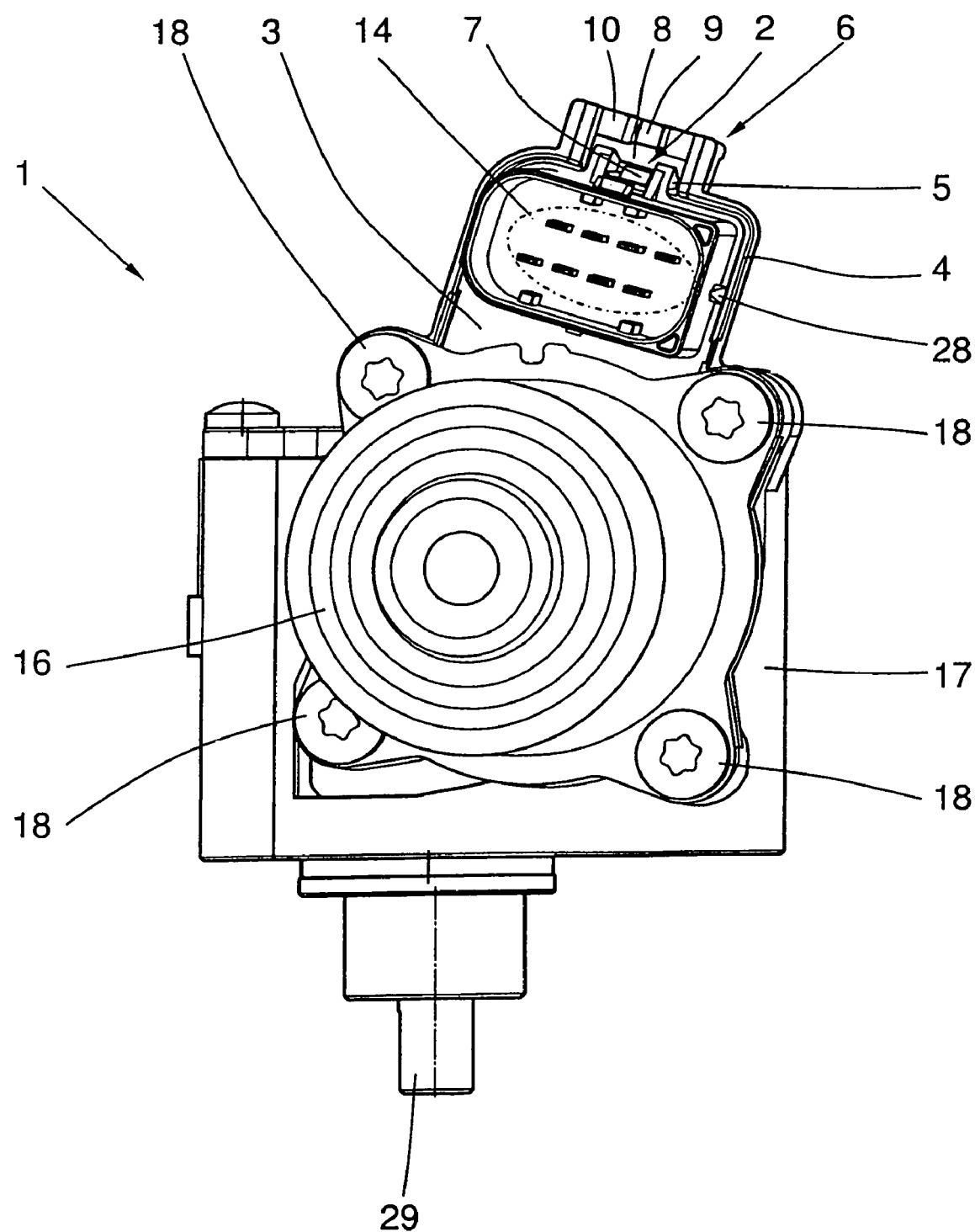
FIG. 2 is a top perspective view of the electric drive.

FIG. 1 shows a three-dimensional view of an electric drive 1 with a first component 3 formed as a brush holder plate and a second component 4 formed as a bearing plate. The brush holder plate is disposed, in the manner of a sandwich, between the housing 16 of an electric motor and the bearing plate 4 which is mechanically connected to a drive housing 17. The motor housing 16, the brush holder plate 3, the bearing plate 4, and the drive housing 17 are interconnected partly via fastening screws 18 and, in the area of a plug housing 11 formed as one piece with the brush holder plate, via a snap-on connector 2. In the plug housings plug lugs 14 are disposed which serve to connect the electric drive 1 to a power supply. The snap-on connector 2 consists of a catch nose 7 fixed with respect to the bearing plate and a catch eyelet 5 fixed with respect to the brush holder plate, the eyelet being expandable and having the catch nose 7 snapped in. So that the snap-on connector 2 is not unintentionally released or damaged during the mounting of the electric drive or its handling, a protective device 6 is provided. In order to enable the expansion of the catch eyelet 5, the protective device 6 is provided with a free space 8 (FIG. 2). The protective device 6 is formed in the form of a bridge 10 which is formed in one piece with the bearing plate. For reasons of forming technology a free recess conforming to the catch nose 7 is provided in the bridge 10. The bridge is formed so that its supporting pillars first project in the radial direction from out of the brush holder plate 3 and the transverse yoke extends in the form of an L in the axial direction and the catch eyelet 5 is covered in this manner.

FIG. 2 shows a second three-dimensional view of the electric drive 1 with the brush holder plate 3, the bearing plate 4, the motor housing 16, the drive housing 17, and an output shaft 29. Here the protective device 6 can be seen more clearly with the free space 8 between the bridge 10 and the snap-on connector 2.

Figure 3:
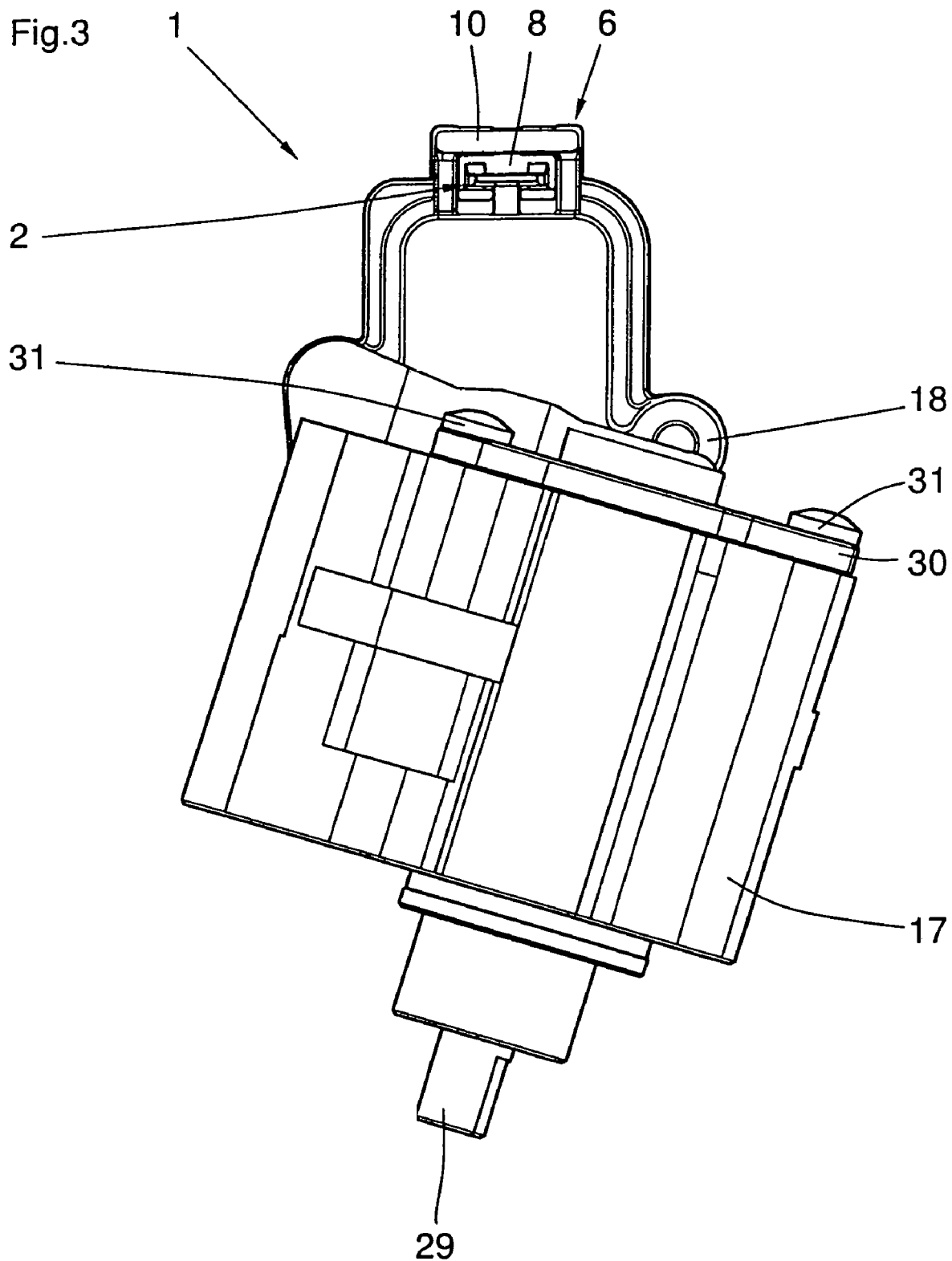
FIG. 3 is a side plan view of the electric drive.

FIG. 3 shows a plan view of the electric drive 1 with the protective device 6 for the snap-on connector 2, the drive housing 17 with a drive housing cover 30 which is fastened by means of drive housing screws 31 to the drive housing 17, and the output shaft 29.

Figure 4:
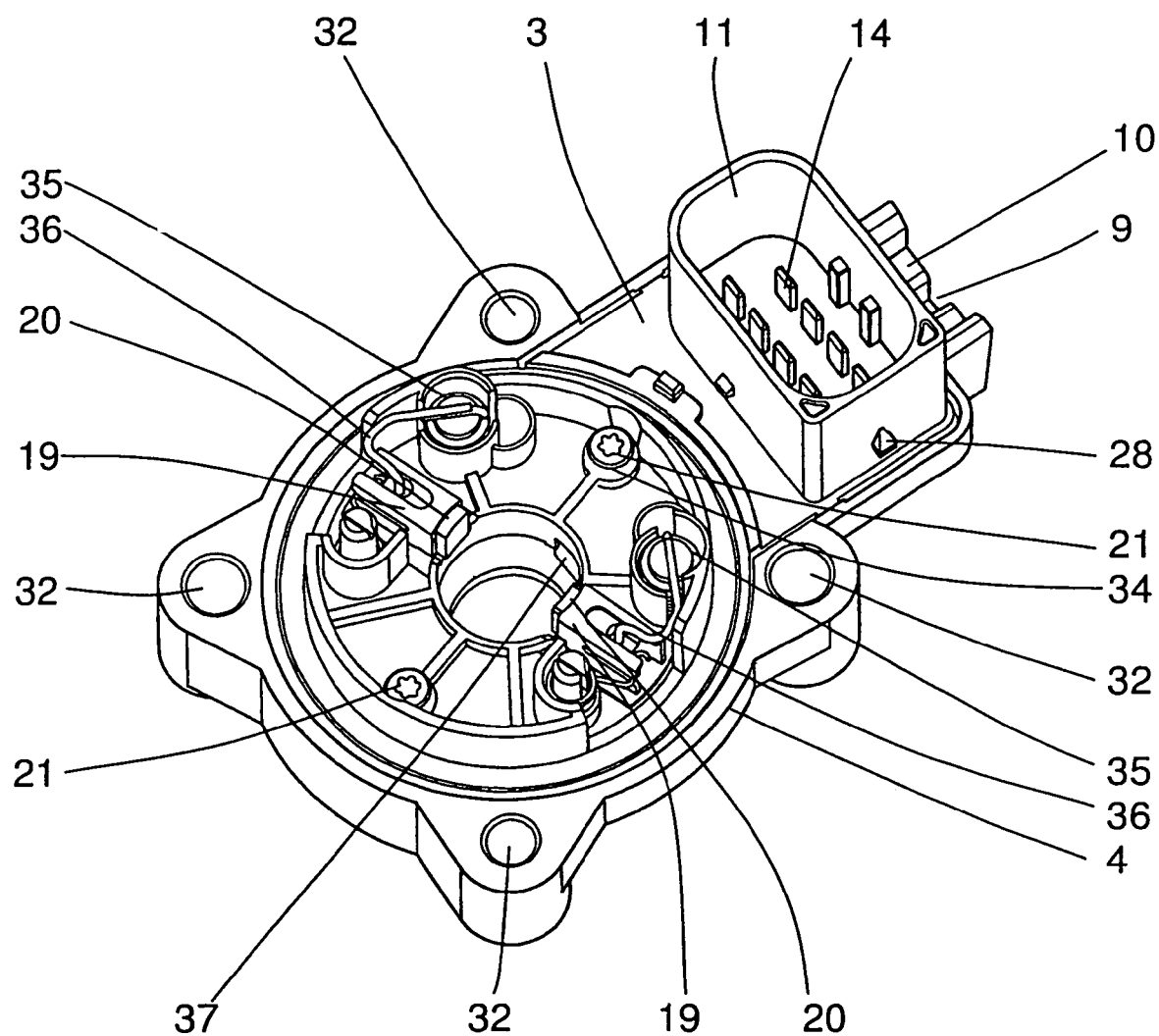
FIG. 4 is a top perspective view of a first component formed as a brush holder plate and mounted on a second component formed as a bearing plate.

FIG. 4 shows a three-dimensional representation of the first component 3 formed as a brush holder plate and mounted on the second component 4 formed as a bearing plate with the plug housing 11, the plug lugs 14, the bridge 10, and the free recess 9. The brush holder plate 3 is fastened by means of mounting screws 21 to the bearing plate 4 and provided with tubular brush holders 19 which serve to guide carbon brushes 20. The bearing plate 4 comprises fastening recesses 32 to receive the fastening screws 18. The brush holder plate 3 is equipped with inductors 36 which are electrically connected on one side to contact points 24 (FIG. 5) of the printed circuit board 13 and on the other side to carbon leads 37. In the brush holder plate 3 a free sensor recess 38 is provided in order to be able to position the sensor nearer to a rotor disposed on the motor shaft.

Figure 5:
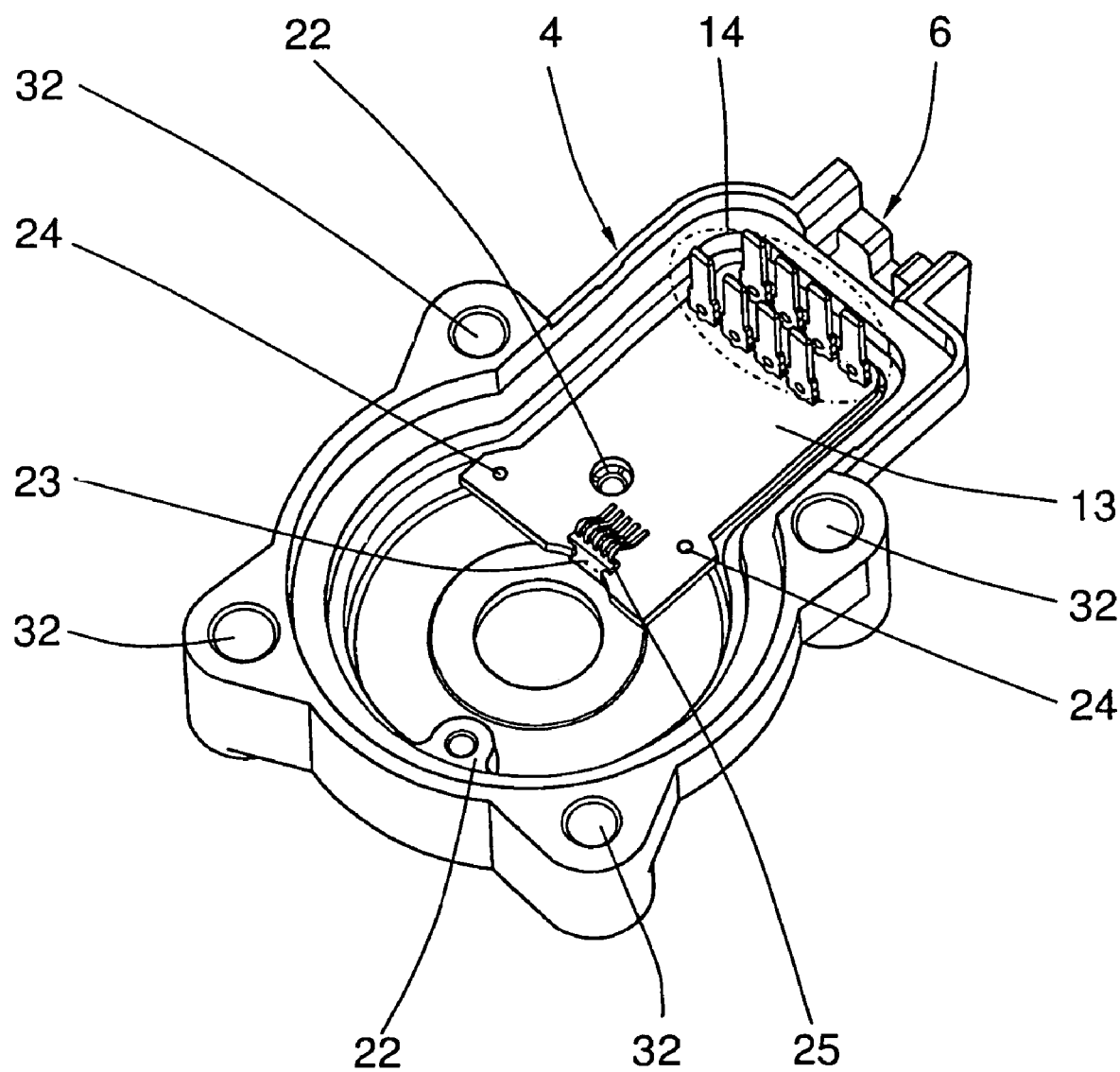
FIG. 5 is a top perspective view of the second component formed as a bearing plate.

FIG. 5 shows a three-dimensional representation of the second component 4 formed as a bearing plate which is provided with a printed circuit board 13 whose ground track is electrically connected to a screw dome 22 and thus to the bearing plate. The printed circuit board serves to electrically connect the plug lugs 14 to the carbon brushes (contact points 24) and the sensor 23, e. g. a Hall sensor, to detect the alternating magnetic field of a rotating rotor (not represented). The sensor 23 is fastened in a sensor recess 25 of the printed circuit board 13. The sensor 23 is disposed on a front side of the printed circuit board 13 which is thus fitted with components on three sides.

Figure 6:
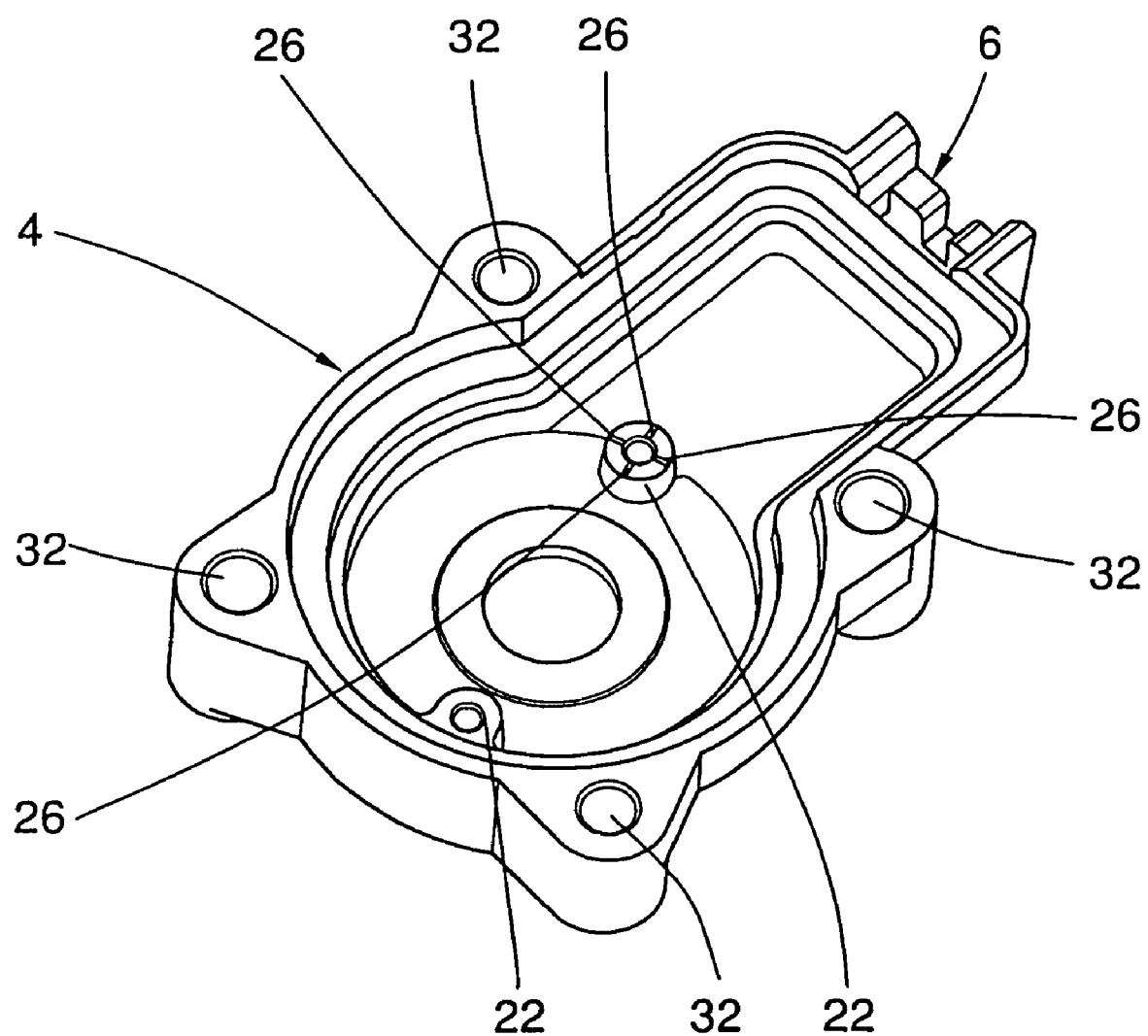
FIG. 6 is an additional top perspective view of the second component.

FIG. 6 shows an additional three-dimensional representation of the second component 4 without a printed circuit board, where the screw dome 22, which is electrically connected to the ground track 27 (FIG. 7) of the printed circuit board 13, is formed with projecting contact ribs 26 facing the printed circuit board 13. One screw dome 22 serves to fasten the printed circuit board as well as the brush holder plate and one screw dome 22 serves only to fasten the brush holder plate 3.

FIG. 7 shows a three-dimensional representation of the brush holder plate 3 with plug housing 11, catch eyelet 5, printed circuit board 13, sensor 23, ground track 27, contact points 24, tubular brush holders 19, carbon brushes 20, and plug lugs which mechanically and electrically are connected directly to the printed circuit board 13. The plug housing is formed by a catch means 28 which conforms to an opposing catch means in a supply line plug. In the brush holder plate 3 an encircling seal 12 is mounted which seals the electrical drive 1 against the effects of the environment. Relating to this, the snap-in connector 2 serves to ensure the sealing action of the seal 12. In case of unintentional loosening of the snap-in connector 2 the electric drive would leak.

FIGS. 8 and 9 show the printed circuit board 13, with the plug lugs 14, sensor 23 which is mechanically fastened in the recess 25, the contact points 24, and fastening recesses 33 to receive the mounting screw 21 and for fastening the screw dome 22.

The structure defining the present invention provides an electric drive which can be securely mounted and handled in an economical manner in which many electric and electronic components are accommodated in a space-saving manner and which has good interference suppression characteristics. According to the invention, this objective is realized by the fact that the inventive electric drive includes an expandable catch means which is protected by a protective device against unintentional expansion of the catch means and thus loosening of the snap-on connector. During the mounting of electric motors, drive motors, or positioning drives, no components may be damaged or unintentionally dismounted. This is ensured by the protective device which shields the perceptibly expandable catch means so that an undesired expansion is only remotely possible.

So that no additional parts are needed for the protective device, the protective device is formed as one piece with at least one of the components interconnected. Preferably the protective device 6 is formed by initially forming an interconnection with at least one of the components 3, 4. This is possible in particular with the use of injection molded plastic parts or diecast metal parts. Alternatively, the protective device can also be formed by initially forming an interconnection along with at least one of the components 3, 4, for example, if the corresponding component is a punched bent part.

Since, in order to fulfill the desired requirements, the protective device must be implemented so as to be stable and robust, it is expedient to form it together with a fixed catch means as one piece on the same component. The fixed component can consist of a catch nose or also of several catch noses or of a catch recess.

As simple a form of the protective device as possible, and thus economically producible, is the protective device 6 in the form of the bridge 10 which bridges the at least one catch nose 7 or catch recess while retaining the free space 8. So that form release is economically possible with the use of an initial forming process, the free space 9 conforming to the at least one catch nose is made in the bridge-like protective device 6.

Because the component 3, 4 which comprises at least one expandable catch means 5 must be elastic, it is preferable that the catch means be implemented as an injection-molded plastic part. In so doing, fiber-reinforced plastic material is used in order to provide sufficient strength. The expandable catch means 5 can be formed as at least one catch eyelet 5 and in the mounted state engages behind the at least one catch nose 7 so as to be form-locking. Also the expandable catch means 5 can also be formed as at least one catch nose.

It is particularly advantageous if the protective device 6, when mounted, has a greater extension than the expandable catch means 5 and, at least in the area of its greatest expandability, i. e. at its end area, projects over it in the direction of its connection and/or expansion. Thus it is insured that the protective device is always in contact with walls or other components during handling or mounting and not the expandable catch means.

The component 3, 4 with the expandable catch means 5 can, by way of example, be formed as one piece with the plug or plug housing 11. For both functions, plastic material can be used, on the one hand due to its elastic, and on the other hand due to its insulating, properties.

The snap-on connector can be provided for compressing the seal 12, which is disposed between the two components 3, 4 to interconnect and seal them. Then it is particularly important to ensure a secure connection.

One of the components 3, 4 to be interconnected can be formed as one piece with a brush holder plate of a commutator motor. A printed circuit board 13, which is electrically and mechanically connected to plug lugs 14 which project through recesses 15 into the plug housing 11, can also be received by the components to be interconnected. In so doing, the printed circuit board 13 can be electrically connected directly to one of the components 3, 4 to be interconnected, where the printed circuit board can be fitted with components on both sides and an electrical connection between plug lugs and brushes of the commutator motor can be produced via its tracks.

It is conceivable that at least one of the two components to be interconnected is a housing part. Also, both components can be housing parts or only partially serve as a housing, for example, as an electronics housing on one side and as a brush holder plate on the other side.

On the other hand, one of the two components 3, 4 to be interconnected can also be a bearing plate of an electric motor or drive motor.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. An electric drive comprising:
   a bearing plate;
   a brush holder plate; and
   at least one snap-on connector for interconnecting two components, the first component being the bearing plate and the second component being the brush holder plate, the at least one snap-on connector including
   a fixed catch means connected to one of the two components,
   an expandable catch means capable of outward expansion, the expandable catch means outwardly projecting from the other of the two of the components for allowing the fixed catch means to be snapped in, and
   a protective device outwardly projecting from the same one of the components as the fixed catch means, the protective device surrounding the expandable catch means and the fixed catch means and providing a space for expansion of the expandable catch means for protecting the expandable catch means against unintentional expansion and loosening of the snap-on connector.

2. The electric drive according to claim 1, wherein the protective device is formed as one piece with one of the two components.

3. The electric drive according to claim 2, wherein the protective device together with a fixed catch means is formed as one piece with one of the two components.

4. The electric drive according to claim 3, wherein the fixed catch means is at least a catch nose or a catch recess.

5. The electric drive according to claim 3, wherein the expandable catch means is formed as at least one catch eyelet and when mounted engages behind the at least one fixed catch means so as to be form-locking.

6. The electric drive according to claim 1, wherein the protective device is formed along with one of the two components.

7. The electric drive according to claim 6, wherein the protective device formed with the component is an injection-molded plastic part or a diecast metal part.

8. The electric drive according to claim 1, wherein the protective device and the component it is attached to is a punched bent part.

9. The electric drive according to claim 1, wherein the protective device is formed in the form of a bridge which bridges the at least one fixed catch means while retaining a free space.

10. The electric drive according to claim 1, wherein the brush holder plate which includes the at least one expandable catch means is formed as a single-piece plastic injection-molded part.

11. The electric drive according to claim 10, wherein the injection-molded plastic part is fiber-reinforced.

12. The electric drive according to claim 1, wherein the protective device in the mounted state has a greater outward extension than the expandable catch means and, at least in the area of its greatest expandability, projects over it in the direction of its connection and/or expansion.

13. The electric drive according to claim 1, wherein the component with the expandable catch means is formed as one piece with a plug or plug housing.

14. The electric drive according to claim 1, further comprising: a seal disposed between the first and second components so as to seal the two components when the snap-on connector presses the seal between the two components.

15. The electric drive according to claim 1, wherein one of the components to be interconnected is formed as one piece with the brush holder plate and the brush holder plate is part of a commutator motor.

16. The electric drive according to claim 15, further comprising: brushes forming part of the commutator motor; and track means providing an electrical connection between the plug lugs and brushes.

17. The electric drive according to claim 1, further comprising:
   a plug housing formed in one of the first and second components;
   a printed circuit board mounted in one of the first and second components; and
   plug lugs projecting through recesses defined in the printed circuit board and extending into the plug housing, the plug lugs being electrically and mechanically connected to the printed circuit board.

18. The electric drive according to claim 17, wherein the printed circuit board is in direct electrical connection with one of the first and second components.

19. The electric drive according to claim 1, wherein at least one of the first and second components forms part of a motor housing.

* * * * *